(12) United States Patent
Li et al.

(10) Patent No.: US 12,705,014 B2
(45) Date of Patent: Aug. 11, 2026

(54) ADAPTIVE IMPLEMENTATION OF AWARE MODE AUDIO

(71) Applicant: Bose Corporation, Framingham, MA (US)

(72) Inventors: Bin Li, Marlborough, MA (US); Emery M. Ku, Somerville, MA (US); Brandon Olmos, Brookline, MA (US)

(73) Assignee: Bose Corporation, Framingham, MA (US)

( * ) Notice: Subject to any disclaimer, the term of this patent is extended or adjusted under 35 U.S.C. 154(b) by 0 days.

(21) Appl. No.: 18/984,345

(22) Filed: Dec. 17, 2024

(65) Prior Publication Data

US 2026/0169676 A1 Jun. 18, 2026

(51) Int. Cl.

| | |
|---|---|
| ***G06F 3/16*** | (2006.01) |
| ***G06F 1/16*** | (2006.01) |
| ***H04R 3/02*** | (2006.01) |

(52) U.S. Cl.
CPC .............. *G06F 3/162* (2013.01); *G06F 1/163* (2013.01); *H04R 3/02* (2013.01)

(58) Field of Classification Search
CPC ............ G06F 3/162; G06F 1/163; H04R 3/02
See application file for complete search history.

(56) References Cited

U.S. PATENT DOCUMENTS 11,386,882 B2 7/2022 Carreras
11,457,304 B1 9/2022 Nielsen
11,503,409 B1 * 11/2022 Nawfal .................... H04R 5/04
2016/0351183 A1 * 12/2016 Gauger, Jr. ...... G10K 11/17881
2019/0246217 A1 8/2019 Miller et al.

FOREIGN PATENT DOCUMENTS

EP 4171060 A1 4/2023
EP 4297428 A1 12/2023
EP 4304201 A1 1/2024

OTHER PUBLICATIONS

International Search Report and the Written Opinion of the International Searching Authority, PCT Application No. PCT/US2025/059611, dated Apr. 9, 2026, pp. 1-11.

* cited by examiner

*Primary Examiner* — Towfiq Elahi
(74) *Attorney, Agent, or Firm* — Bond, Schoeneck & King, PLLC

(57) ABSTRACT

A method for rendering output audio via a wearable audio device is provided. The method includes: (1) generating an aware audio signal based on a playback audio signal and an environmental aware signal corresponding to a feedforward microphone; (2) filtering, via an adaptive filter, the aware audio signal to generate an adapted aware signal; (3) generating an acoustic driver signal based on the adapted aware signal and a feedback audio signal corresponding to a feedback microphone; and (4) rendering, via an acoustic driver, output audio based on the acoustic driver signal. The adaptive filter is configured to adapt based on the aware audio signal and the feedback audio signal.

18 Claims, 7 Drawing Sheets

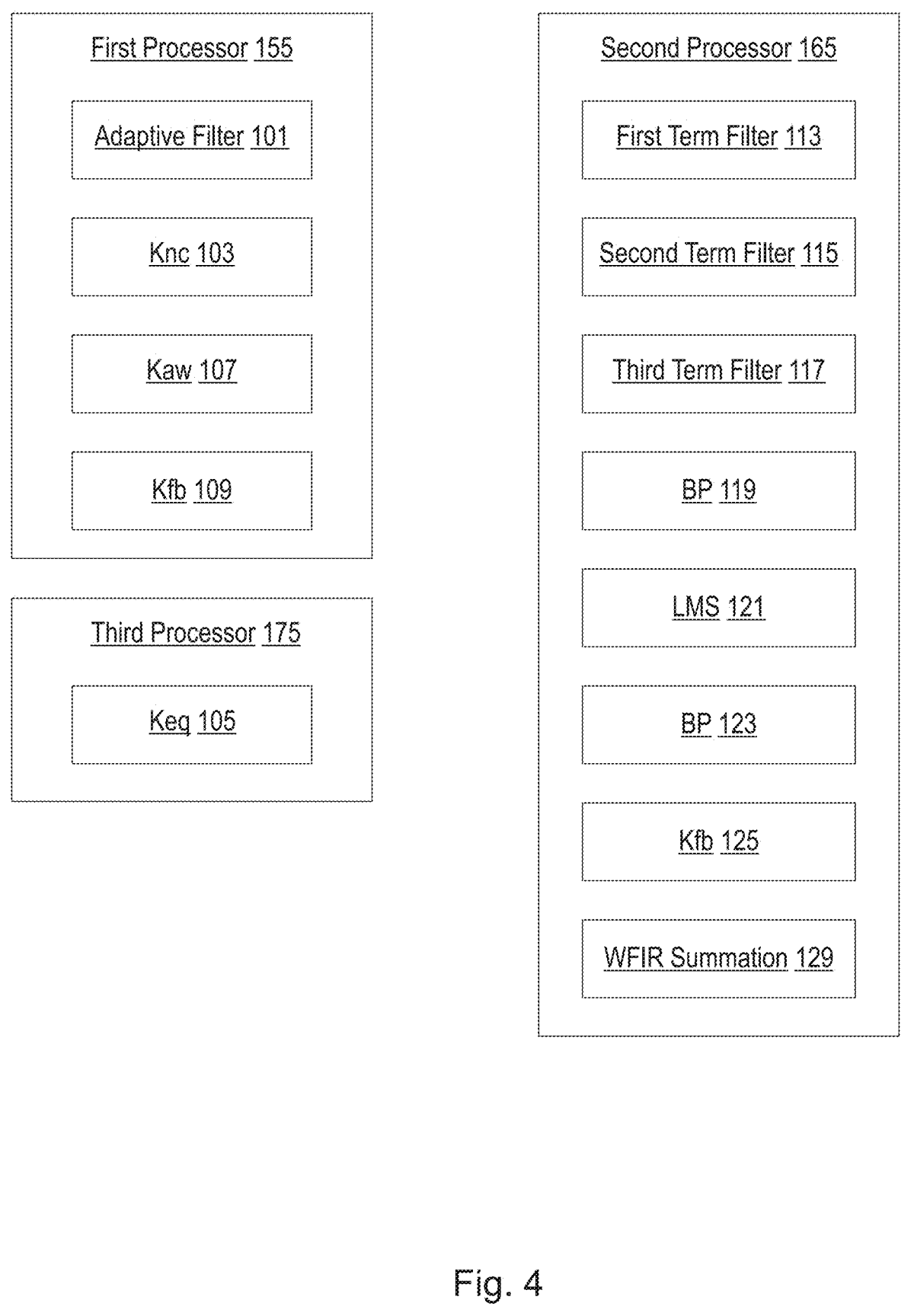

First Processor 155

Adaptive Filter 101

Knc 103

Kaw 107

Kfb 109

Third Processor 175

Keq 105

Second Processor 165

First Term Filter 113

Second Term Filter 115

Third Term Filter 117

BP 119

LMS 121

BP 123

Kfb 125

WFIR Summation 129

Fig. 4

ADAPTIVE IMPLEMENTATION OF AWARE MODE AUDIO

FIELD OF THE DISCLOSURE

The present disclosure is generally directed to a wearable audio device providing an adaptive aware mode audio.

BACKGROUND

Wearable audio devices, such as audio headphones, may operate in an aware mode where environmental sound is captured by an external microphone and reproduced (along with other audio, such as entertainment audio) via an acoustic driver for a user. The aware mode may provide an important safety benefit when the wearable audio device is worn in public places, particularly if the audio headphones significantly attenuate the environmental sounds heard by the user through headphone fit and/or noise cancellation systems. Some existing aware mode-implementations require accurate measurements of a transfer function between the acoustic driver rendering audio for the user and a feedback microphone to capture the rendered audio for analysis and adjustment. This transfer function is typically determined through measurements of the wearable audio device on several test subjects during manufacturing. However, an end user may wear the wearable audio device much differently than the test subjects, resulting in an inaccurate transfer function. The inaccurate transfer function may lead to inaccurate renderings of the environmental sounds in aware mode.

SUMMARY

The present disclosure is generally directed to systems and methods for providing a wearable audio device (such as audio headphones or earbuds) operating with an adaptive aware mode. In particular, the wearable audio device implements an adaptive filter to adjust the output audio to improve aware mode performance such that environmental sounds reproduced by the wearable audio device sound as accurate and authentic as possible.

The wearable audio device includes a controller, an audio driver, a feedback microphone, and a feedforward microphone. The feedback microphone is positioned to capture output audio rendered by the audio driver, such as within an earcup of an audio headphone or the housing of an earbud, and generate a feedback audio signal. The feedforward microphone is positioned to capture environmental sounds and generate an environmental aware signal. The wearable audio device also receives a playback audio signal. The playback audio signal may be provided by an external device in wired or wireless communication with the wearable audio device, such as a smartphone. The playback audio signal may include entertainment audio, telephone call audio, etc.

The playback audio signal is filtered by a playback path equalizer to generate a filtered playback signal. The environmental aware signal is also filtered by an aware path filter to generate a filtered environmental signal. The filtered playback signal and the filtered environmental signal are then combined to generate an aware audio signal. The aware audio signal is then filtered by an adaptive filter to generate an adapted aware signal. An acoustic driver signal is then generated based on the adapted aware signal and the feedback audio signal, and the acoustic driver renders the output audio for the user to hear based on the acoustic driver signal. While the wearable audio device is in use, the adaptive filter actively adapts one or more filter coefficients based on the aware audio signal and the feedback audio signal in order to provide an accurate reproduction of the environmental sounds to the user.

In some examples, the wearable audio device operates in a command injection mode. In the command injection mode, the adapted aware signal and the feedback audio signal are combined to generate the acoustic driver signal. The acoustic driver signal is filtered via a feedback path filter to generate a filtered driver signal, and the audio driver renders the output audio based on the filtered driver signal. In other examples, the wearable audio device operates in a disturbance injection mode. In disturbance injection mode, the feedback audio signal is filtered by the feedback path filter to generate a filtered feedback signal. The adapted aware signal is not filtered, and instead the acoustic driver signal is generated by combining the adapted aware signal with the filtered feedback signal. The audio driver then renders the audio output based on the acoustic driver signal. In some examples, the wearable audio device may operate in the command injection mode in certain frequency ranges, and disturbance injection mode at other frequency ranges.

In some examples, a noise-cancellation filter is used to generate a noise-cancellation signal based on the environmental aware signal captured by the feedforward microphone. The noise-cancellation signal is then also used to generate the output audio provided to the user. Further, in order to reduce power consumption, the adaptive filter may adapt at a slower rate than the filters in the system may operate.

Generally, in one example, a wearable audio device is provided. The wearable device comprises an acoustic driver, a feedforward microphone, a feedback microphone, and a controller. The controller is configured to generate an aware audio signal based on a playback audio signal and an environmental aware signal corresponding to the feedforward microphone.

The controller is further configured to filter, via an adaptive filter, the aware audio signal to generate an adapted aware signal.

The controller is further configured to generate an acoustic driver signal based on the adapted aware signal and a feedback audio signal, wherein the feedback audio signal is generated by the feedback microphone.

The controller is further configured to render, via the acoustic driver, output audio based on the acoustic driver signal.

The adaptive filter is configured to adapt based on the aware audio signal and the feedback audio signal.

According to an example, output audio is generated further based on a noise-cancellation signal.

According to an example, the noise-cancellation signal is generated by filtering the environmental aware signal with a noise-cancellation filter.

According to an example, the aware audio signal is generated by: (1) filtering, via a playback path equalizer, the playback audio signal to generate a filtered playback signal; (2) filtering, via an aware path filter, the environmental aware signal to generate a filtered environmental signal; and (3) combining the filtered playback signal and the filtered environmental signal to generate the aware audio signal.

According to an example, the adaptive filter adapts at an adaptation rate, and the adaptation rate is less than an operation rate of the aware path filter.

According to an example, the output audio is rendered by: (1) combining the adapted aware signal and the feedback audio signal to generate the acoustic driver signal; (2) filtering, via a feedback path filter, the acoustic driver signal to generate a filtered driver signal; and (3) rendering the output audio based on the filtered driver signal.

According to an example, wherein the adaptive filter adapts at an adaptation rate, and wherein the adaptation rate is less than an operation rate of the feedback path filter.

According to an example, the acoustic driver signal is generated by: (1) filtering, via a feedback path filter, the feedback audio signal to generate a filtered feedback signal; and (2) combining the filtered feedback signal and the adapted aware signal to generate the acoustic driver signal.

According to an example, the feedforward microphone is acoustically coupled to an external environment of the wearable audio device.

According to an example, the feedback microphone is positioned to capture the output audio rendered by the acoustic driver.

Generally, in another example, a method for rendering output audio via a wearable audio device is provided. The method includes: (1) generating an aware audio signal based on a playback audio signal and an environmental aware signal corresponding to a feedforward microphone; (2) filtering, via an adaptive filter, the aware audio signal to generate an adapted aware signal; (3) generating an acoustic driver signal based on the adapted aware signal and a feedback audio signal corresponding to a feedback microphone; and (4) rendering, via an acoustic driver, output audio based on the acoustic driver signal. The adaptive filter is configured to adapt based on the aware audio signal and the feedback audio signal.

According to an example, the output audio is generated further based on a noise-cancellation signal.

According to an example, the noise-cancellation signal is generated by filtering the environmental aware signal with a noise-cancellation filter.

According to an example, the aware audio signal is generated by: (1) filtering, via a playback path equalizer, the playback audio signal to generate a filtered playback signal; (2) filtering, via an aware path filter, the environmental aware signal to generate a filtered environmental signal; and (3) combining the filtered playback signal and the filtered environmental signal to generate the aware audio signal.

According to an example, the adaptive filter adapts at an adaptation rate, and wherein the adaptation rate is less than an operation rate of the aware path filter.

According to an example, the output audio is rendered by: (1) combining the adapted aware signal and the feedback audio signal to generate the acoustic driver signal; (2) filtering, via a feedback path filter, the acoustic driver signal to generate a filtered driver signal; and (3) rendering the output audio based on the filtered driver signal.

According to an example, the adaptive filter adapts at an adaptation rate, and the adaptation rate is less than an operation rate of the feedback path filter.

According to an example, the acoustic driver signal is generated by: (1) filtering, via a feedback path filter, the feedback audio signal to generate a filtered feedback signal; and (2) combining the filtered feedback signal and the adapted aware signal to generate the acoustic driver signal.

According to an example, the feedforward microphone is acoustically coupled to an external environment of the wearable audio device.

According to an example, the feedback microphone is positioned to capture the output audio rendered by the acoustic driver.

In various implementations, a processor or controller can be associated with one or more storage media (generically referred to herein as "memory," e.g., volatile and non-volatile computer memory such as ROM, RAM, PROM, EPROM, and EEPROM, floppy disks, compact disks, optical disks, magnetic tape, Flash, OTP-ROM, SSD, HDD, etc.). In some implementations, the storage media can be encoded with one or more programs that, when executed on one or more processors and/or controllers, perform at least some of the functions discussed herein. Various storage media can be fixed within a processor or controller or can be transportable, such that the one or more programs stored thereon can be loaded into a processor or controller so as to implement various aspects as discussed herein. The terms "program" or "computer program" are used herein in a generic sense to refer to any type of computer code (e.g., software or microcode) that can be employed to program one or more processors or controllers.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also can appear in any disclosure incorporated by reference should be accorded a meaning most consistent with the particular concepts disclosed herein.

Other features and advantages will be apparent from the description and the claims.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the various embodiments.

FIG. 4 is a schematic diagram of processors implemented by a controller of the wearable audio device, according to an example.

DETAILED DESCRIPTION

Figure 1:
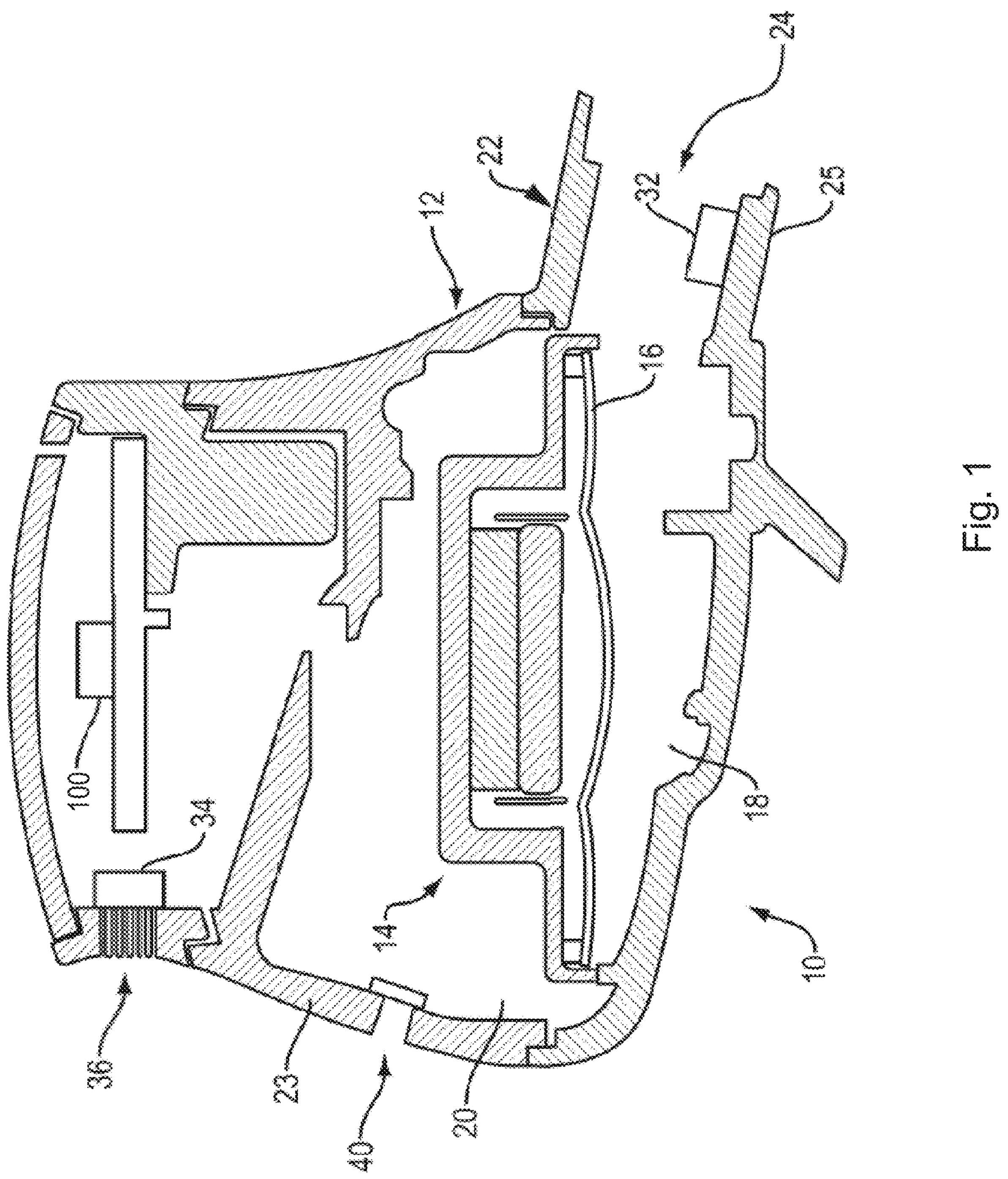
FIG. 1 is a cross-section of a wearable audio device, in accordance with an example.

The present disclosure is generally directed to systems and methods for providing a wearable audio device operating with an adaptive aware mode. In particular, the wearable audio device implements an adaptive filter to adjust the output audio to improve aware mode performance such that environmental sounds reproduced by the wearable audio device sounds as accurate and authentic as possible. The wearable audio device includes a controller, an audio driver, a feedback microphone, and a feedforward microphone. A playback audio signal is filtered by a playback path equalizer to generate a filtered playback signal. An environmental aware signal (corresponding to the feedforward microphone) is also filtered by an aware path filter to generate a filtered environmental signal. The filtered playback signal and the filtered environmental signal are then combined to generate an aware audio signal. The aware audio signal is then filtered by an adaptive filter to generate an adapted aware signal. An acoustic driver signal is then generated based on the adapted aware signal and a feedback audio signal (corresponding to the feedback microphone), and the acoustic driver renders the output audio for the user to hear based on the acoustic driver signal. While the wearable audio device is in use, the adaptive filter actively adapts one or more filter coefficients based on the aware audio signal and the feedback audio signal in order to provide an accurate reproduction of the environmental sounds to the user.

The following description should be read in view of FIGS. 1-6.

The term "wearable audio device," as used in this application, in addition to including its ordinary meaning or its meaning known to those skilled in the art, is intended to mean a device that fits around, on, in, or near an car (including open-car audio devices worn on the head or shoulders of a user) and that radiates acoustic energy into or towards the car. Wearable audio devices are sometimes referred to as headphones, earphones, earpieces, headsets, earbuds or sport headphones, and can be wired or wireless. A wearable audio device includes an acoustic driver to transduce audio signals to acoustic energy. The acoustic driver can be housed in an earcup. While some of the figures and descriptions following can show a single wearable audio device, having a pair of earcups (each including an acoustic driver) it should be appreciated that a wearable audio device can be a single stand-alone unit having only one earcup. Each earcup of the wearable audio device can be connected mechanically to another earcup or headphone, for example by a headband and/or by leads that conduct audio signals to an acoustic driver in the ear cup or headphone. A wearable audio device can include components for wirelessly receiving audio signals. A wearable audio device can include components of an active noise reduction (ANR) system. Wearable audio devices can also include other functionality such as a microphone so that they can function as a headset. While the non-limiting example of FIG. 1 depicts the wearable audio device 10 as an earbud, the wearable audio device 10 described below may be any of the aforementioned types of devices.

FIG. 1 illustrates a non-limiting example of a wearable audio device 10 as an earbud. The wearable audio device 10 includes body or housing 12 that houses the active components of the device 10. Housing 12 encloses electro-acoustic transducer (also referred to as an acoustic driver) 14 that generates sound via movable diaphragm 16. The housing 12 comprises a front housing portion 22 and a rear housing portion 23. A diaphragm 16 is driven in order to create sound pressure in front housing cavity 18. Sound is also created in a rear housing cavity 20. Sound pressure is directed from the front housing cavity 18 out of front housing portion 22 via sound outlet 24. An internal microphone (also referred to a feedback microphone) 32 is located inside housing 12. In an example, the feedback microphone 32 is arranged within a housing portion 22, as shown in FIG. 1. An external microphone (also referred to as a feedforward microphone) 34 is configured to sense sound external to the housing 12. In an example, the feedforward microphone 34 is located inside of the housing and is acoustically coupled to the external environment via a plurality of housing openings 36 that let environmental sound reach the feedforward microphone 34. In an example, the feedback microphone 32 is used for active noise reduction (ANR), and the feedforward microphone 34 is used for ANR, and/or for aware mode operation where environmental sound is sensed and then reproduced to the user such that the user is more environmentally aware and can hear others speaking and the like. The wearable audio device 10 embodied as an earbud may also include a pliable tip (not shown) that is engaged with a neck 25 of the housing portion 22, to help direct the sound into an ear canal of the user. Details of the wearable audio device 10 embodied as an earbud are exemplary and do not limit the scope of this disclosure, as the present functionality can be used in varied types and designs of earbuds, earphones, and other types of headphones.

Wearable audio device 10 also includes controller 100. The controller may include a processor and a memory. In some examples, the processor of the controller 100 is configured to process outputs of feedback and feedforward microphones 32, 34. In some examples, the controller 100 is used to accomplish other processing needed for earbud functionality, such as processing digital sound files that are to be reproduced by the earbud, as would be apparent to one skilled in the technical field. In an example, the controller 100 is configured to implement the various audio processing aspects described below. Examples of wearable audio devices are described in U.S. Pat. No. 11,457,304, which is incorporated herein by reference in its entirety.

Figure 2:
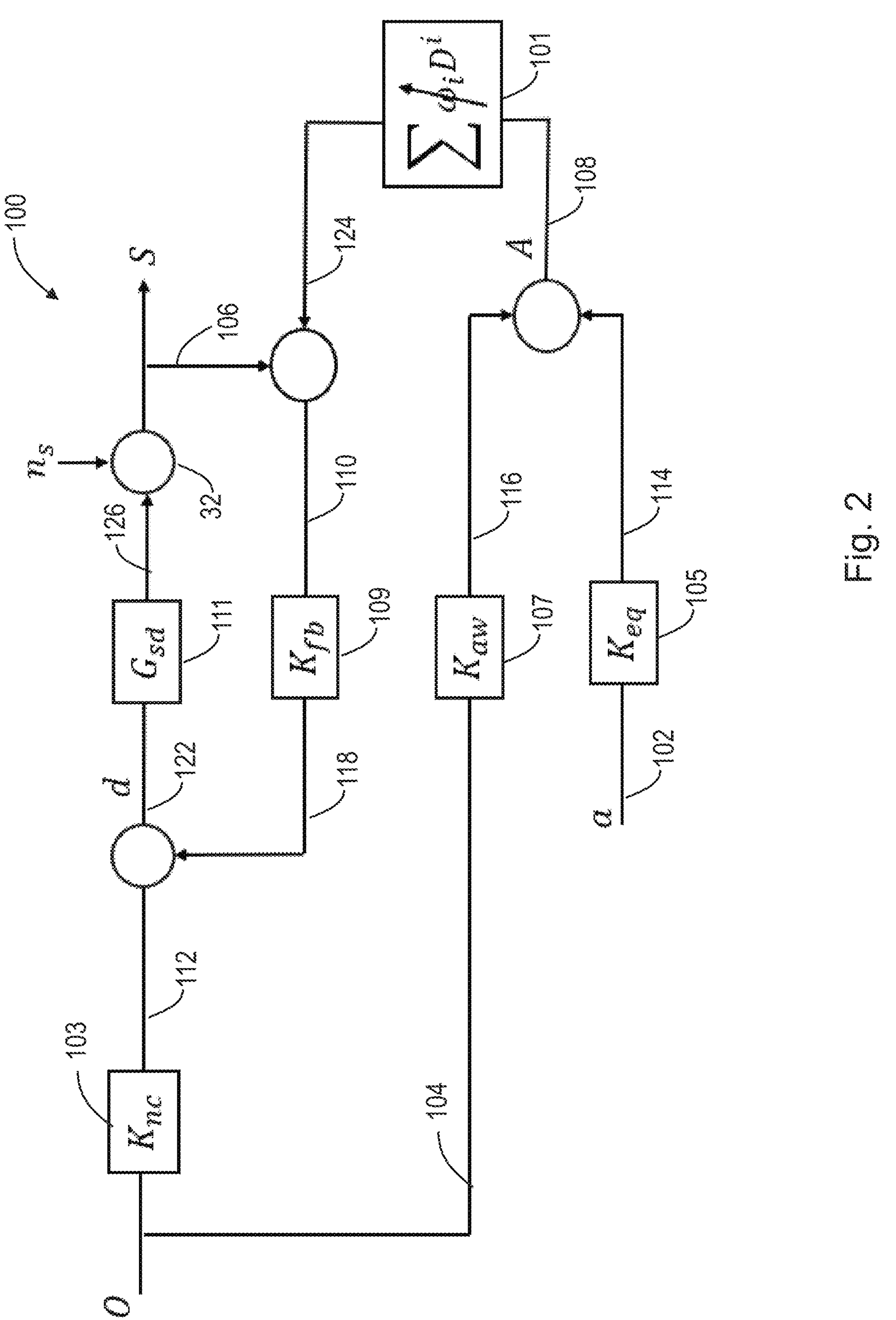
FIG. 2 is a functional block diagram of aspects of a system for providing improved aware audio configured in command injection mode, according to an example.

FIGS. 2-5 illustrate a functional block diagram of audio processing aspects of the controller 100. The various aspects illustrated in FIG. 2 may be implemented by a processor and a memory. As shown in FIG. 2, the controller 100 receives three external signals. First, the controller 100 receives a playback audio signal 102. Broadly, the playback audio signal 102 conveys audio information that the user wishes to be rendered via acoustic driver 14 of the wearable audio device 10. The playback audio signal 102 may be provided by an external source device in wired or wireless communication with the wearable audio device 10, such as a smartphone. The playback audio signal 102 may include entertainment audio, telephone call audio, etc. In the block diagrams of FIGS. 2-5, the playback audio signal 102 is labeled a.

Second, the controller 100 also receives an environmental aware signal 104. The environmental aware signal 104 is provided by the feedforward microphone 34 shown in FIG. 1. The feedforward microphone 34 captures environmental sound occurring around the wearable audio device 10. The environmental aware signal 104 is processed to be used for ANR, and/or for aware mode operation. In the block diagrams of FIGS. 2-5, the playback audio signal 102 is labeled O.

Third, the controller 100 also receives a feedback audio signal 106. The feedback audio signal 106 is provided by the feedback microphone 32. The feedback audio signal 106 is intended to capture sound rendered by the acoustic driver 14 as it enters the car canal of the user. The feedback audio signal 106 is processed to be used for ANR. In the block diagrams of FIGS. 2-5, the feedback audio signal 106 is labeled S.

As shown in FIG. 2, the playback audio signal 102 is processed by a playback path equalizer 105 (labeled $K_{eq}$) to generate a filtered playback signal 114. The frequency response of the playback path equalizer 105 may be controlled by one or more factory and/or user settings. Additionally, the environmental aware signal 104 is processed by an aware path filter 107 (labeled $K_{aw}$) to generate a filtered environmental signal 116. The filtered playback signal 114 and the filtered environmental signal 116 are then combined to generate an aware audio signal 108 (labeled A). Thus, the aware audio signal 108 incorporates both playback audio (music, telephone call audio, etc.) provided by a source device (such as a smartphone) and environmental sounds captured by the feedforward microphone 34. In some alternate examples, the aware audio signal 108 may only include either the filtered playback signal 114 or the filtered environmental signal 116. In some examples, the user may disable aware mode operation, wishing only to hear audio rendered according to the playback audio signal 102 (such as music or other entertainment audio), resulting in an aware audio signal 108 matching the filtered playback signal 114. In other examples, the user may disable or temporarily mute audio corresponding to the playback audio signal 102, resulting in the user only hearing environmental sounds. Accordingly, in these examples, the aware audio signal matches the filtered environmental signal 116.

The aware audio signal 108 is processed by an adaptive filter 101 to generate an adapted aware signal 124. In FIGS. 2-5, the adaptive filter is labeled by $\Sigma\omega_i D^i$. In some examples, the adaptive filter 101 is a finite impulse response (FIR) filter, such as a warped FIR (WFIR) filter where $\omega_i$ is a filter coefficient and $D^i$ is a delay element. As will be subsequently described, the filter coefficients are continuously updated during operation of the wearable audio device 10, adjusted resulting in more accurate rendering of the environmental sounds. Generally, the filter coefficients are adjusted by processing the audio playback signal 102, the feedback audio signal 106, and the aware audio signal 108. A non-limiting example of this signal processing will be described with respect to FIG. 3.

In the non-limiting example of FIG. 2, the adapted aware signal 124 is combined or added with the feedback audio signal 106 to generate an acoustic driver signal 110. In some examples adding the feedback audio signal 106 to the acoustic driver signal 110 may be useful to reduce unwanted noise or otherwise enhance the acoustic driver signal 110, Broadly, the acoustic driver signal 110 is used by the acoustic driver 14 to render sound. In FIG. 2, the acoustic driver signal 110 is processed by feedback path filter 109 (labeled $K_{fb}$) to generate a filtered driver signal 118. Because the combination of the feedback audio signal 106 and the adapted aware signal 124 are filtered by the feedback path filter 109, the aspects illustrated in FIG. 2 may be considered to be configured in command-injection mode.

The acoustic driver 14 (not shown in FIGS. 2-5) renders output audio based on an output signal 122 (labeled d). In the example of FIG. 2, the output signal 122 is based on the filtered driver signal 118. Prior to the output audio being received by the feedback microphone 32, the output audio is impacted by a transfer function 111 (labeled as $G_{sd}$). The transfer function 111 represents the effect of the wearable audio device 10 on the output audio as the output audio travels from the acoustic driver 14 to the feedback microphone 32, resulting in feedback audio 126. The feedback microphone 32 captures the feedback audio 126 along with noise $n_s$ to generate the feedback audio signal 106.

In some examples, the output signal 122 is generated based on a combination of the filtered driver signal 118 and a noise-cancellation signal 112. As shown in FIG. 2, the noise-cancellation signal 112 is generated by processing the environmental aware signal 104 with a noise-cancellation filter 103 (labeled $K_{nc}$).

Generally, the target value of adaptive filter 101 may be referred to as $K_t$. Similarly, the target audio to be heard by the user may be referred to as sr. Accordingly, adapting to the target audio $s_t$ in real time while the wearable audio device 10 is worn enables each wearable audio device 10 to provide environmental sounds of the same quality to each user, regardless of variations in fit, orientation, ear shape, etc. Further, this adaptation may occur continuously while the user listens to the combination of the playback audio and the environmental sounds, and does not require the use of a test tone or other discrete calibration steps. Thus, the relationship of the various aspects of FIG. 2 may be defined as:

$$d=A*K_t*K_{fb}+K_{fb}s_t \quad \text{(Equation 1)}$$

$$s_t=G_{sd}d+N_{so}O \quad \text{(Equation 2)}$$

Where $N_{so}O$ represents the product noise (intrinsic noise of the feedback microphone 32) and environmental sounds captured by the feedback microphone 32. In this example, $N_{so}O=n_s$. Therefore, in the absence of external noise ($n_s=0$):

$$s_t=G_{sd}d \quad \text{(Equation 3)}$$

Previous analysis has also determined that $K_t$ may be expressed as:

$$K_t=\frac{1-G_{sd}K_{fb}}{K_{fb}(\alpha G_{sd}+\beta)} \quad \text{(Equation 4)}$$

This $K_t$ formula enables the environmental sounds provided in aware audio mode to be the same for all users, regardless of the fit of the wearable audio device. α and β in Equation 4 may be determined according to:

$$sqrt\left(\frac{S_{cc,open}}{S_{rr,open}}\right)*\frac{1}{|G_{cd}|}=\left|\frac{1}{\alpha*G_{sd}+\beta}\right| \quad \text{(Equation 5)}$$

$S_{cc,open}$ is the energy captured by an ear canal microphone when headphones or earbuds are not worn (i.e., open). The ear canal microphone is used for testing purposes and acts as a stand-in for an ear drum of a user. $S_{rr,open}$ is the energy captured by a reference microphone when headphones or earbuds are not worn (i.e., open). $G_{cd}$ is the transfer function from the acoustic driver 14 to the ear canal microphone. $S_{ccopen}$, $S_{rropen}$, $G_{cd}$, and $G_{sd}$ are measured during manufacturing. In some examples, the testing involves a sample size of 10 subject heads, 3 fits per ear, and 2 ears per subject. Those measurements are substituted into Equation 5 to solve for α and β.

Equation 5 may be reorganized as shown below:

$$(1-G_{sd}K_{fb})d=\frac{1-G_{sd}K_{fb}}{\alpha G_{sd}+\beta}A \quad \text{(Equation 6)}$$

$$(\alpha G_{sd}+\beta)d=A \quad \text{(Equation 7)}$$

$$\alpha G_{sd}d+\beta d=\alpha s_t+\beta d=A \quad \text{(Equation 8)}$$

Considering all of the terms of Equations 1 and 2, the output audio generated by the acoustic driver 14 may be represented as:

$$d = A * K_t * K_{fb} + K_{fb}s_t = A * \frac{1 - G_{sd}K_{fb}}{(\alpha G_{sd} + \beta)K_{fb}} * K_{fb} + K_{fb}s_t \qquad \text{(Equation 9)}$$

Multiplying $\alpha G_{sd}+\beta$ to each side of the equation results in:

$$\alpha G_{sd}d+\beta d=(1-G_{sd}K_{fb})A+\alpha k_{fb}G_{sd}s_t+\beta K_{fb}s_t \qquad \text{(Equation 10)}$$

Based on Equation 2, $G_{sd}d$ is replaced with $S_{nag}-N_{so}O$, and $K_{fb}s_t$ with $K_{fb}(G_{sd}d+N_{so}O)$, resulting in:

$$\alpha(s_t-N_{so}O)+\beta d=(1-G_{sd}K_{fb})A+\alpha G_{sd}K_{fb}s_t+\beta K_{fb}(G_{sd}d+N_{so}O) \qquad \text{(Equation 11)}$$

Reorganizing Equation 11 results in:

$$\alpha s_t-\alpha N_{so}*O+\beta d-\alpha G_{sd}K_{fb}s_t-\beta G_{sd}K_{fb}d-\beta K_{fb}N_{so}O=(1-G_{sd}K_{fb})A \qquad \text{(Equation 12)}$$

Equation 12 may be further simplified to:

$$\alpha(1-G_{sd}K_{fb})s_t+\beta(1-G_{sd}K_{fb})d-(\alpha+\beta K_{fb})N_{so}O=(1-G_{sd}K_{fb})A \qquad \text{(Equation 13)}$$

Dividing $(1-G_{sd}K_{fb})$ by both sides of Equation 13 results in:

$$\alpha S_t+\beta d-(\alpha+\beta K_{fb})N_{sowfb}O=A \qquad \text{(Equation 14)}$$

where $N_{sowfb}$ represents the closed-loop $N_{so}$ with feedback. Substituting a mean value (rather an actual, measured value) for $N_{sowfb}$ results in:

$$\alpha s_t+\beta d-(\alpha+\beta K_{fb})d\ \mathrm{mean}(N_{sowfb})*O=A \qquad \text{(Equation 15)}$$

Re-organizing Equation 15 to solve for $s_t$ results in:

$$s_t = \frac{1}{\alpha}A + \left(1 + \frac{\beta}{\alpha} * K_{fb}\right) * dmean(N_{sowfb}) * 0 - \frac{\beta}{\alpha} * d \qquad \text{(Equation 16)}$$

Accordingly, for optimum performance, $s_t$ is the target signal for the feedback audio signal 106.

Figure 3:
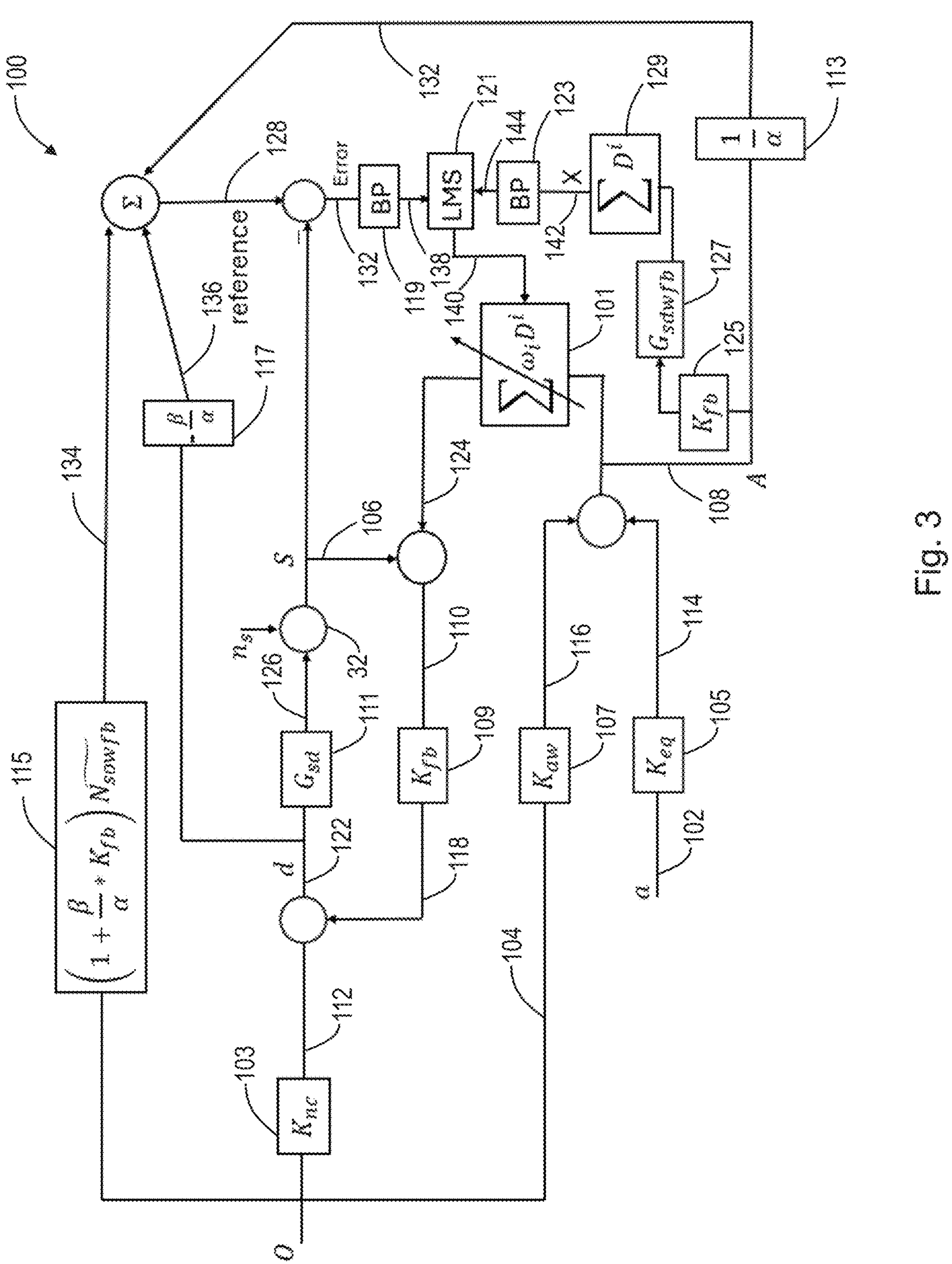
FIG. 3 is a functional block diagram showing additional aspects of the system of FIG. 2, according to an example.

FIG. 3 is a more detailed version of the block diagram of FIG. 2 showing how filter coefficients of the adaptive filter 101 are adjusted to optimize the feedback audio signal 106 according to $s_t$ as defined in Equation 16. As shown in FIG. 3, the feedback audio signal 106 is subtracted from a target reference signal 128 to determine an error signal 130. The target reference signal 128 is a summation of the three terms of $s_t$ as defined in Equation 16. The first term signal 132 may be defined as $$\frac{1}{\alpha}A$$

according to a first term filter 113, and is therefore based on the aware audio signal 108. The second term signal 134 may be defined as $$\left(1 + \frac{\beta}{\alpha} * K_{fb}\right) * dmean(N_{sowfb}) * 0$$

according to a second term filter 115, and is therefore based on the environmental aware signal 104 as well as a noise value $N_{sowfb}$ which is measured during manufacturing. The third term signal 136 may be defined as $$\frac{\beta}{\alpha} * d$$

according to a third term filter 117, and is therefore based on the output signal 122. As shown in FIG. 3, the error signal 130 is filtered by a first bandpass filter (BP) 119 to generate a filtered error signal 138. The filtered error signal 138 is then provided to a least mean squares (LMS) filter 121. As will be described in more detail below, the LMS filter 121 provides an adaptation signal 140 to the adaptive filter 101 to update the filter coefficients wi.

The adaptation signal 140 is further generated based on a predicted signal 142 (labeled X). As can be seen in FIG. 3, the predicted signal 142 is determined based on processing the aware audio signal 108 with a second feedback path filter 125 ($K_{fb}$), a transfer function 127 ($G_{sdwfb}$), and a WFIR summation 129 ($\Sigma D^i$) and can be represented as:

$$X=\Sigma D^i G_{sdwfb}K_{fb}A \qquad \text{(Equation 17)}$$

The transfer function 127 is closed-loop version of transfer function 111 incorporating feedback. Further, the predicted signal 142 may be filtered by a second bandpass filter 123 to generate a filtered comparison signal 144. The filter coefficients ($\boldsymbol{\omega}=[\omega_0\ \omega_1 \ldots \omega_N]^T$) of the adaptive filter 101 are updated based on the adaptation signal 140. The adaptation signal 140 is updated iteratively according to the filtered error signal 138 and the filtered comparison signal 144. First, the initial value of the filter coefficients are defined as following: $\boldsymbol{\omega}[0]=[1\ 0 \ldots 0]^T$. Then for the rest of the time steps, the filter coefficient is iteratively updated based on:

$$\boldsymbol{\omega}[n]=\boldsymbol{\omega}[n-1]-\delta*\mathrm{sign}\{\mathrm{error}[n]*X[n]\} \qquad \text{(Equation 18)}$$

In Equation 18, step size 8 is some predefined small value, and sign { } is a sign function, with an output value of −1, +1 or 0 depending on the sign of the multiplication value of the filtered error signal 138 and the filtered comparison signal 144. While the example shown in FIG. 3 illustrates a sign-sign-LMS approach to calculating the adaptation of the adaptive filter 101, other techniques, such as recursive least squares (RLS) or Kalman filtering, may be used instead of sign-sign-LMS. These other techniques are usually less prone to slow convergence issues than sign-sign-LMS, but may be more computationally expensive.

FIG. 4 illustrates a first processor 155, a second processor 165, and a third processor 175 implemented by the controller 100. As shown in FIG. 4, the adaptive filter 101 operates at a similar operation rate to many of the other filters in the system. Therefore, the adaptive filter 101, the noise-cancellation filter 103, the aware path filter 107, and the feedback path filter 109 are executed by a first processor 155 (which may also be referred to as a "fast" processor) that operates at a high frequency, such as 384 kHz. This high rate of operation may be required to prevent latency issues. However, the adaptation signal 140 used to update the filter coefficients of the adaptive filter 101 may be generated at a low frequency, such as 24 kHz. Thus, the first term filter 113, the second term filter 115, the third term filter 117, the first bandpass filter 119, the LMS filter 121, the second bandpass filter 123, the second feedback path filter 125, and the WFIR summation 129 are executed by a second processor 165 (which may also be referred to as a "slow processor") at this low frequency. This slower rate of adaptation allows the overall system to conserve power for more processing intensive tasks. Further, a third processor 175 may be used to execute the playback path equalizer 105 at a third frequency between the high frequency and the low frequency, such as 48 kHz. Examples of computational architectures implementing multiple processors to perform different tasks and functions are described in U.S. Pat. No. 11,386,882, which is incorporated herein by reference in its entirety.

Figure 5:
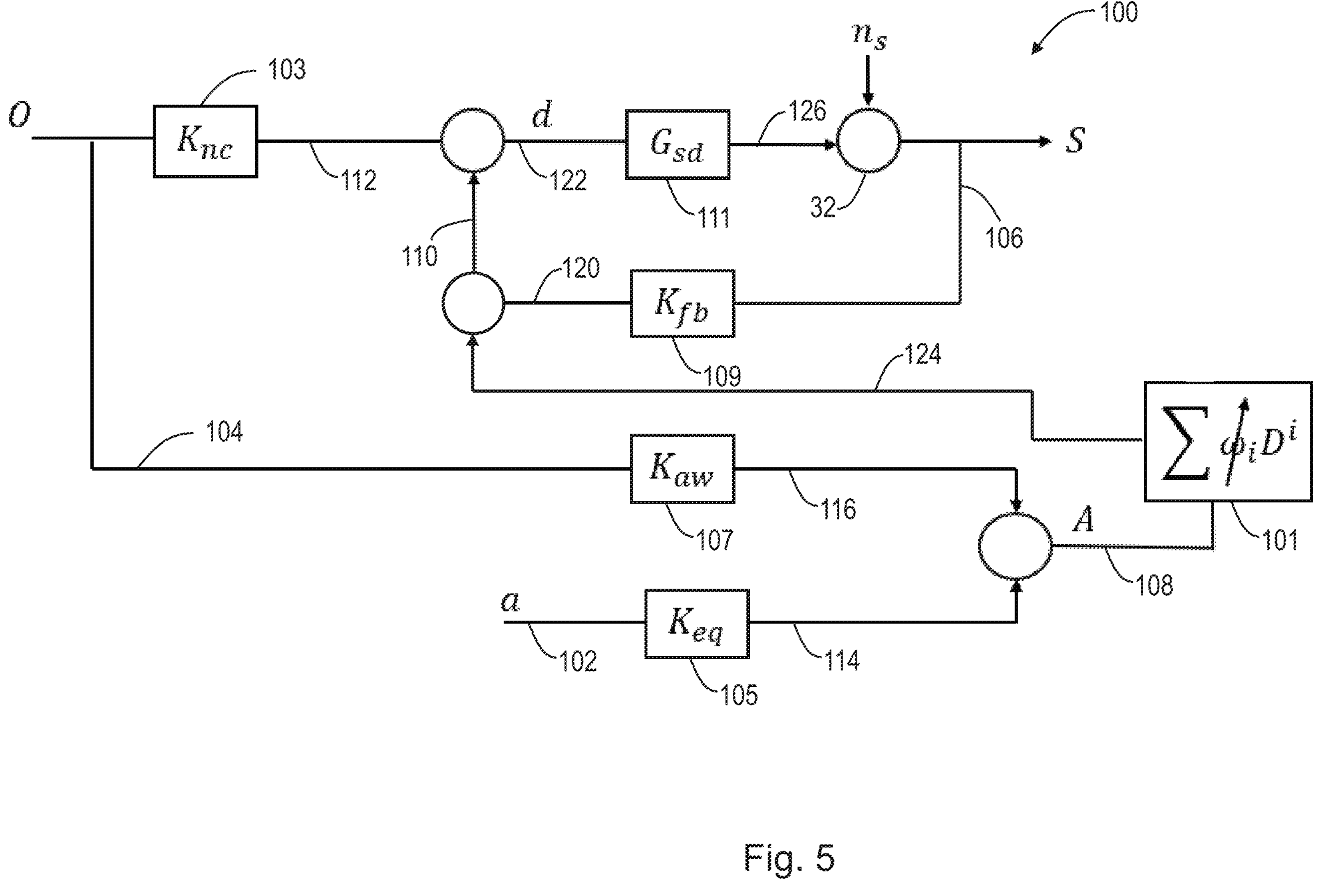
FIG. 5 is a functional block diagram of aspects of a system for providing improved aware audio configured in disturbance injection mode, according to an example.
Figure 6:
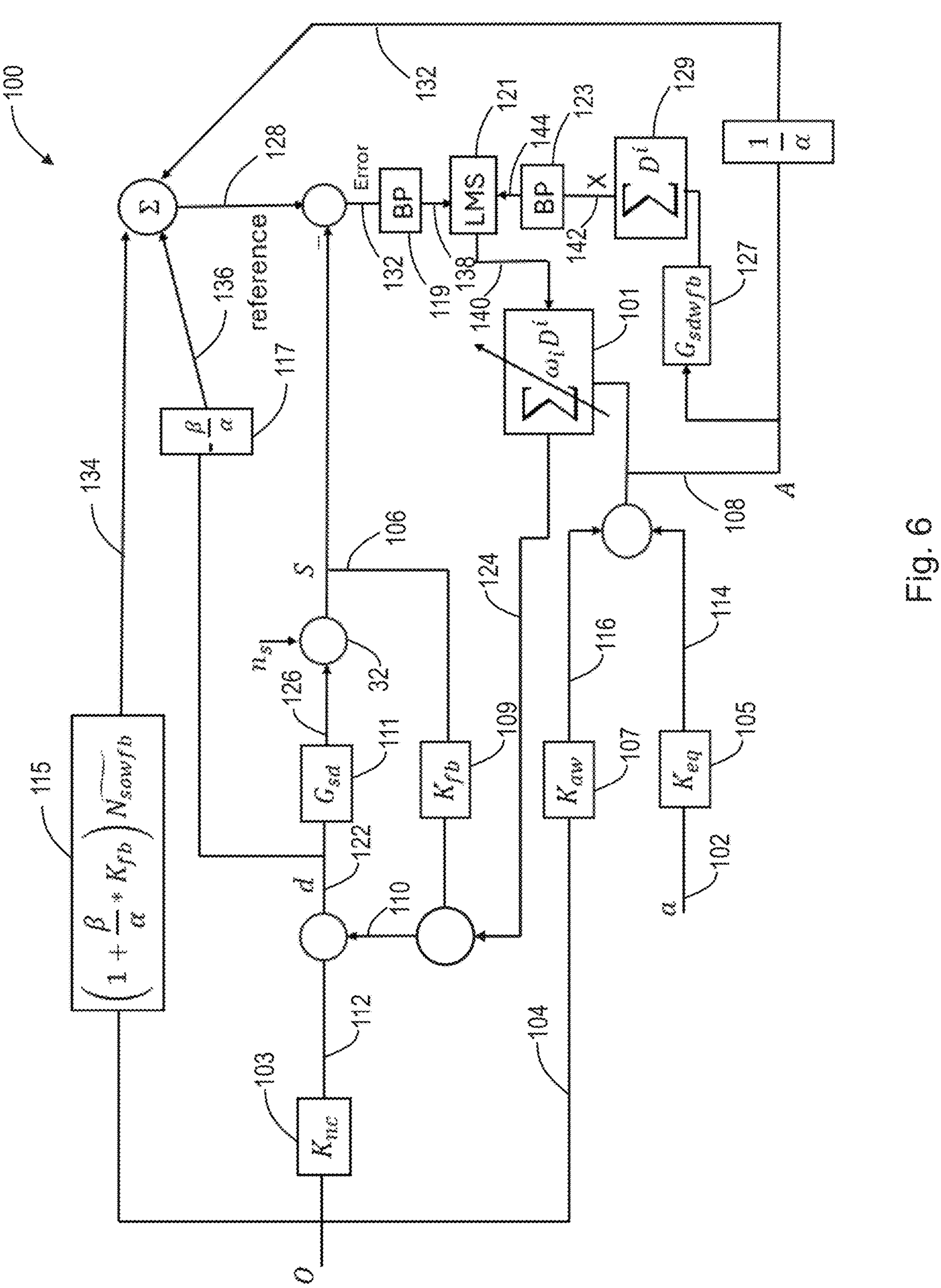
FIG. 6 is a functional block diagram showing additional aspects of the system of FIG. 5, according to an example.

FIG. 5 illustrates a disturbance injection, rather than command injection, variation of the block diagram of FIG. 2. As can been seen in FIG. 5, in the disturbance injection configuration, data comprising the adapted aware signal 124 is not filtered by the feedback path filter 109. Instead, the feedback path filter 109 simply receives the feedback audio signal 106, rather than a combination of the feedback audio signal 106 and the adapted aware signal 124. The feedback path filter 109 then generates a filtered feedback signal 120, which is combined with the adapted aware signal 124 to generate the acoustic driver signal 110. The acoustic driver signal 110 is then combined with the noise-cancellation signal 112 to generate the output signal 122 used to drive the acoustic driver 14. Further, as shown in FIG. 6, aware audio signal 108 is not filtered by a feedback filter to generate the predicted signal 142. Accordingly, the predicted signal 142 in FIG. 6 may be represented by:

$$X=\Sigma D^i G_{sdwfb} A \quad \text{(Equation 18)}$$

In some examples, the command injection configuration of FIGS. 2 and 3 may be implemented at low frequencies (such as below 1 kHz), while the disturbance injection configuration of FIGS. 5 and 6 may be implemented at high frequencies (such as above 1 kHz).

Figure 7:
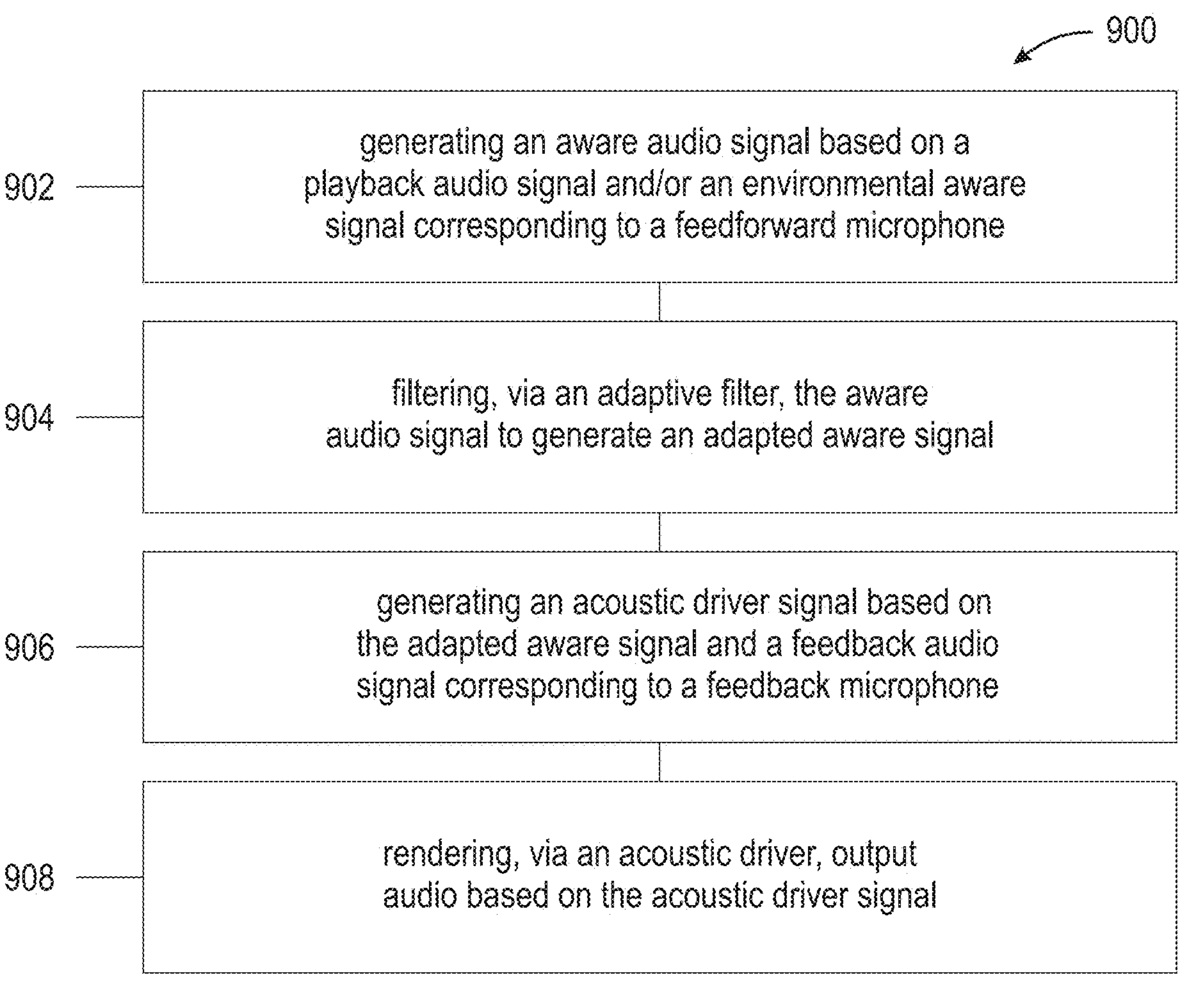
FIG. 7 is a flow chart of a method for rendering output audio via a wearable audio device, in accordance with an example.

FIG. 7 is a flow chart of a method 900 for rendering output audio via a wearable audio device 10. Referring to FIGS. 1-7, the method 900 includes, in step 902, generating an aware audio signal 108 based on a playback audio signal 102 and/or an environmental aware signal 104 corresponding to a feedforward microphone 34.

The method 900 further includes, in step 904, filtering, via an adaptive filter 101, the aware audio signal 108 to generate an adapted aware signal 124.

The method 900 further includes, in step 906, generating an acoustic driver signal 110 based on the adapted aware signal 124 and a feedback audio signal 106 corresponding to a feedback microphone 32.

The method 900 further includes, in step 908, rendering, via an acoustic driver 14, output audio based on the acoustic driver signal 110. The adaptive filter 101 is configured to adapt based on the aware audio signal 108 and the feedback audio signal 106.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements can optionally be present other than the elements specifically identified by the "and/or" clause, whether related or unrelated to those elements specifically identified.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements can optionally be present other than the elements specifically identified within the list of elements to which the phrase "at least one" refers, whether related or unrelated to those elements specifically identified.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

The above-described examples of the described subject matter can be implemented in any of numerous ways. For example, some aspects can be implemented using hardware, software or a combination thereof. When any aspect is implemented at least in part in software, the software code can be executed on any suitable processor or collection of processors, whether provided in a single device or computer or distributed among multiple devices/computers.

The present disclosure can be implemented as a system, a method, and/or a computer program product at any possible technical detail level of integration. The computer program product can include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a wave-guide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some examples, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to examples of the disclosure. It will be understood that each block of the flowchart illustrations and/or block diagrams, and combinations of blocks in the flowchart illustrations and/or block diagrams, can be implemented by computer readable program instructions.

The computer readable program instructions can be provided to a processor of a, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various examples of the present disclosure. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Other implementations are within the scope of the following claims and other claims to which the applicant can be entitled.

While various examples have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the examples described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific examples described herein. It is, therefore, to be understood that the foregoing examples are presented by way of example only and that, within the scope of the appended claims and equivalents thereto, examples can be practiced otherwise than as specifically described and claimed. Examples of the present disclosure are directed to each individual feature, system, article, material, and/or method described herein. In addition, any combination of two or more such features, systems, articles, materials, and/or methods, if such features, systems, articles, materials, and/or methods are not mutually inconsistent, is included within the scope of the present disclosure.

What is claimed is:

1. A wearable audio device comprising an acoustic driver, a feedforward microphone, a feedback microphone, and a controller, wherein the controller is configured to:

generate an aware audio signal based on a playback audio signal and/or an environmental aware signal corresponding to the feedforward microphone;

filter, via an adaptive filter, the aware audio signal to generate an adapted aware signal;

generate an acoustic driver signal based on the adapted aware signal and a feedback audio signal, wherein the feedback audio signal is generated by the feedback microphone; and render, via the acoustic driver, output audio based on the acoustic driver signal, wherein the adaptive filter is configured to adapt based on the aware audio signal and the feedback audio signal, wherein the aware audio signal is generated by:

filtering, via a playback path equalizer, the playback audio signal to generate a filtered playback signal;

filtering, via an aware path filter, the environmental aware signal to generate a filtered environmental signal, wherein the adaptive filter adapts at an adaptation rate, and wherein the adaptation rate is less than an operation rate of the aware path filter; and combining the filtered playback signal and the filtered environmental signal to generate the aware audio signal.

2. The wearable audio device of claim 1, wherein the output audio is generated further based on a noise-cancellation signal.

3. The wearable audio device of claim 2, wherein the noise-cancellation signal is generated by filtering the environmental aware signal with a noise-cancellation filter.

4. The wearable audio device of claim 1, wherein the output audio is rendered by:

combining the adapted aware signal and the feedback audio signal to generate the acoustic driver signal;

filtering, via a feedback path filter, the acoustic driver signal to generate a filtered driver signal; and rendering the output audio based on the filtered driver signal.

5. The wearable audio device of claim 4, wherein the adaptive filter adapts at an adaptation rate, and wherein the adaptation rate is less than an operation rate of the feedback path filter.

6. The wearable audio device of claim 1, wherein the acoustic driver signal is generated by:

filtering, via a feedback path filter, the feedback audio signal to generate a filtered feedback signal; and combining the filtered feedback signal and the adapted aware signal to generate the acoustic driver signal.

7. The wearable audio device of claim 1, wherein the feedforward microphone is acoustically coupled to an external environment of the wearable audio device.

8. The wearable audio device of claim 1, wherein the feedback microphone is positioned to capture the output audio rendered by the acoustic driver.

9. A method for rendering output audio via a wearable audio device, comprising:

generating an aware audio signal based on a playback audio signal and/or an environmental aware signal corresponding to a feedforward microphone;

filtering, via an adaptive filter, the aware audio signal to generate an adapted aware signal;

generating an acoustic driver signal based on the adapted aware signal and a feedback audio signal corresponding to a feedback microphone; and rendering, via an acoustic driver, output audio based on the acoustic driver signal, wherein the adaptive filter is configured to adapt based on the aware audio signal and the feedback audio signal, wherein the aware audio signal is generated by:

filtering, via a playback path equalizer, the playback audio signal to generate a filtered playback signal;

filtering, via an aware path filter, the environmental aware signal to generate a filtered environmental signal, wherein the adaptive filter adapts at an adaptation rate, and wherein the adaptation rate is less than an operation rate of the aware path filter; and combining the filtered playback signal and the filtered environmental signal to generate the aware audio signal.

10. The method of claim 9, wherein the output audio is generated further based on a noise-cancellation signal.

11. The method of claim 10, wherein the noise-cancellation signal is generated by filtering the environmental aware signal with a noise-cancellation filter.

12. The method of claim 9, wherein the output audio is rendered by:

combining the adapted aware signal and the feedback audio signal to generate the acoustic driver signal;

filtering, via a feedback path filter, the acoustic driver signal to generate a filtered driver signal; and rendering the output audio based on the filtered driver signal.

13. The method of claim 12, wherein the adaptive filter adapts at an adaptation rate, and wherein the adaptation rate is less than an operation rate of the feedback path filter.

14. The method of claim 9, wherein the acoustic driver signal is generated by:

filtering, via a feedback path filter, the feedback audio signal to generate a filtered feedback signal; and combining the filtered feedback signal and the adapted aware signal to generate the acoustic driver signal.

15. The method of claim 9, wherein the feedforward microphone is acoustically coupled to an external environment of the wearable audio device.

16. The method of claim 9, wherein the feedback microphone is positioned to capture the output audio rendered by the acoustic driver.

17. A wearable audio device comprising an acoustic driver, a feedforward microphone, a feedback microphone, and a controller, wherein the controller is configured to:

generate an aware audio signal based on a playback audio signal and/or an environmental aware signal corresponding to the feedforward microphone;

filter, via an adaptive filter, the aware audio signal to generate an adapted aware signal;

generate an acoustic driver signal based on the adapted aware signal and a feedback audio signal, wherein the feedback audio signal is generated by the feedback microphone; and render, via the acoustic driver, output audio based on the acoustic driver signal, wherein the adaptive filter is configured to adapt based on the aware audio signal and the feedback audio signal, wherein the output audio is rendered by:

combining the adapted aware signal and the feedback audio signal to generate the acoustic driver signal;

filtering, via a feedback path filter, the acoustic driver signal to generate a filtered driver signal, wherein the adaptive filter adapts at an adaptation rate, and wherein the adaptation rate is less than an operation rate of the feedback path filter; and rendering the output audio based on the filtered driver signal.

18. A method for rendering output audio via a wearable audio device, comprising generating an aware audio signal based on a playback audio signal and/or an environmental aware signal corresponding to a feedforward microphone;

filtering, via an adaptive filter, the aware audio signal to generate an adapted aware signal;

generating an acoustic driver signal based on the adapted aware signal and a feedback audio signal corresponding to a feedback microphone; and rendering, via an acoustic driver, output audio based on the acoustic driver signal, wherein the adaptive filter is configured to adapt based on the aware audio signal and the feedback audio signal, wherein the output audio is rendered by:

combining the adapted aware signal and the feedback audio signal to generate the acoustic driver signal;

filtering, via a feedback path filter, the acoustic driver signal to generate a filtered driver signal, wherein the adaptive filter adapts at an adaptation rate, and wherein the adaptation rate is less than an operation rate of the feedback path filter; and rendering the output audio based on the filtered driver signal.

* * * * *